United States Patent
Wu et al.

(10) Patent No.: US 9,998,164 B2
(45) Date of Patent: Jun. 12, 2018

(54) DEVICE FOR AFFIXING SIM CARD AND MOBILE TERMINAL

(71) Applicant: Xiaomi Inc., Beijing (CN)

(72) Inventors: Fenghui Wu, Beijing (CN); Kesheng Yan, Beijing (CN)

(73) Assignee: XIAOMI INC., Beijing (CN)

( * ) Notice: Subject to any disclaimer, the term of this patent is extended or adjusted under 35 U.S.C. 154(b) by 0 days. days.

(21) Appl. No.: 14/957,207

(22) Filed: Dec. 2, 2015

(65) Prior Publication Data

US 2016/0126997 A1 May 5, 2016

Related U.S. Application Data

(63) Continuation of application No. PCT/CN2015/075176, filed on Mar. 27, 2015.

(30) Foreign Application Priority Data

Oct. 31, 2014 (CN) .......................... 2014 1 0602817

(51) Int. Cl.
- *H04M 1/00* (2006.01)
- *H04B 1/3818* (2015.01)
- *G06K 13/08* (2006.01)

(52) U.S. Cl.
CPC ........... *H04B 1/3818* (2015.01); *G06K 13/08* (2013.01)

(58) Field of Classification Search
CPC .............................. H04B 1/3838; G06K 13/08
USPC ...................................... 455/575.1
See application file for complete search history.

(56) References Cited

U.S. PATENT DOCUMENTS

| 2008/0132120 | A1 | 6/2008 | Tsai | |
|---|---|---|---|---|
| 2009/0199221 | A1* | 8/2009 | Wang | G11B 17/056 720/601 |
| 2010/0053913 | A1* | 3/2010 | Lee | H04M 1/026 361/752 |
| 2012/0276765 | A1 | 11/2012 | Nakase | |

(Continued)

FOREIGN PATENT DOCUMENTS

| CN | 1131772 A | 9/1996 |
|---|---|---|
| CN | 200944621 Y | 9/2007 |

(Continued)

OTHER PUBLICATIONS

International Search Report to PCT/CN2015/075176 dated Jul. 22, 2015 and English Summary, (4p).

(Continued)

*Primary Examiner* — Kathy Wang-Hurst
*Assistant Examiner* — Said Elnoubi
(74) *Attorney, Agent, or Firm* — Arch & Lake LLP (57) ABSTRACT

A device for affixing SIM card and a mobile terminal are provided. The device is arranged in the mobile terminal, which includes: a card tray, a card holder, and a locking mechanism for fitting the card tray. The card holder includes a first elastic component. The locking mechanism includes: a press component, a lock rod and a second elastic component. The lock rod includes a lock catch, while the card tray includes a lock piece. The press component includes a first driving surface in contact with the lock rod. The second elastic component is connected to the lock rod and configured to reset the lock rod after the card tray is removed.

20 Claims, 10 Drawing Sheets

(56) References Cited

U.S. PATENT DOCUMENTS

| | | | | |
|---|---|---|---|---|
| 2013/0196523 A1* | 8/2013 | Lim | ............... | G06K 7/0021 |
| | | | | 439/153 |
| 2014/0154926 A1 | 6/2014 | Cao | | |
| 2014/0185199 A1* | 7/2014 | Chen | ............... | H05K 5/0295 |
| | | | | 361/679.01 |

FOREIGN PATENT DOCUMENTS

| | | | |
|---|---|---|---|
| CN | 202084706 U | | 12/2011 |
| CN | 202523918 U | * | 11/2012 |
| CN | 202523918 U | | 11/2012 |
| CN | 103151645 A | | 6/2013 |
| CN | 103414489 A | | 11/2013 |
| CN | 203406864 U | | 1/2014 |
| CN | 103915719 A | | 7/2014 |
| CN | 103929516 A | | 7/2014 |
| CN | 203787603 U | | 8/2014 |
| CN | 204156923 U | | 2/2015 |
| JP | 3189346 B2 | | 7/2001 |
| JP | 2002183674 A | | 6/2002 |
| KR | 100771425 B1 | | 10/2007 |
| RU | 79730 U1 | | 1/2009 |
| WO | WO 2013144291 A1 | | 10/2013 |

OTHER PUBLICATIONS

Office Action for Russian Application No. 2420-525153RU/030 dated Jul. 19, 2016.

Office Action for Korean Application No. 15086788 dated Sep. 5, 2016.

Office Action for Japanese Application No. 2016-555906 dated Dec. 13, 2016.

International Search Report for PCT/CN2015/075176 dated Jul. 22, 2015.

European Extended Search Report for Application No. 15192431.3 dated Mar. 15, 2016.

First Office Action issued in corresponding Chinese Patent Application No. 201410602817.6, dated Dec. 5, 2017, 8 pages.

* cited by examiner

DEVICE FOR AFFIXING SIM CARD AND MOBILE TERMINAL

CROSS-REFERENCE TO RELATED APPLICATIONS

This application is a Continuation Application of International Application PCT/CN2015/075176, with an international filing date of Mar. 27, 2015, which is based on and claims priority to Chinese Patent Application No. 201410602817.6, filed on Oct. 31, 2014, the entire contents of which are incorporated herein by reference.

TECHNICAL FIELD

The present disclosure generally relates to a terminal structure, and more particularly, to a device for affixing SIM card in a terminal and a mobile terminal including the device.

BACKGROUND

In related technologies, a SIM card in a mobile phone is generally assembled and disassembled by means of a card tray and a eject pin. In other words, the SIM card is placed on the card tray, and then the card tray is pushed into the card holder of the mobile phone. The eject pin need to be inserted through a pin hole on the mobile phone shell to removing the card tray, where the eject pin pushes a rotating shaft which pops the card tray out of the mobile phone by using the lever principle. However, in such way, users are required to take an eject pin along themselves. Otherwise, it is unable to remove a SIM card, thus it is quite inconvenient.

SUMMARY

The present disclosure provides a device for affixing SIM card and a mobile terminal for realization of convenient assembly and disassembly of a SIM card.

According to the first aspect of the embodiments of the present disclosure, a device for affixing a SIM card in a terminal is provided. The device includes: a card tray for bearing a SIM card, a card holder for bearing the card tray when the card tray is fitted into the terminal, and a locking mechanism for affixing the card tray. The card holder includes a first elastic component which is configured to apply a force, directed toward the outside of the terminal, to the card tray when the SIM card is being removed. The locking mechanism includes: a press component, a lock rod and a second elastic component. The lock rod includes a lock catch thereon, while the card tray includes a lock piece, when the card tray bearing the SIM card is fitted into the terminal, the lock catch and the lock piece form a matching resistance to prevent the card tray from being removed. The press component includes a driving surface in contact with the lock rod, which is configured to push the lock rod to move when the press component is pressed, thus driving the lock catch on the lock rod to move so as to remove the card tray by eliminating the matching resistance between the lock piece and the lock catch. The second elastic component is connected to the lock rod, and configured to reset the lock rod after the card tray is removed.

According to the second aspect of the embodiments of the present disclosure, a mobile terminal is provided. The mobile terminal includes: a housing and the device for affixing SIM card according to the embodiments of the present disclosure; the housing includes a slot for insertion of the card tray, the device for affixing SIM card is arranged on the housing, and the lock rod of the device includes a slot position corresponding to the slot and for insertion of the card tray.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The solutions provided in the embodiments of the present disclosure may achieve following beneficial effects. A locking mechanism including a press component and a lock rod is provided. When the press component is pressed, the lock rod may be pushed to move and unlock the card tray. Moreover, with the matching between the lock catch on the lock rod and the lock piece on the card tray, when the card tray is pushed, the card tray may be prevented from being removed, thus realizing convenient assembly and disassembly of the SIM card.

Figure 1:
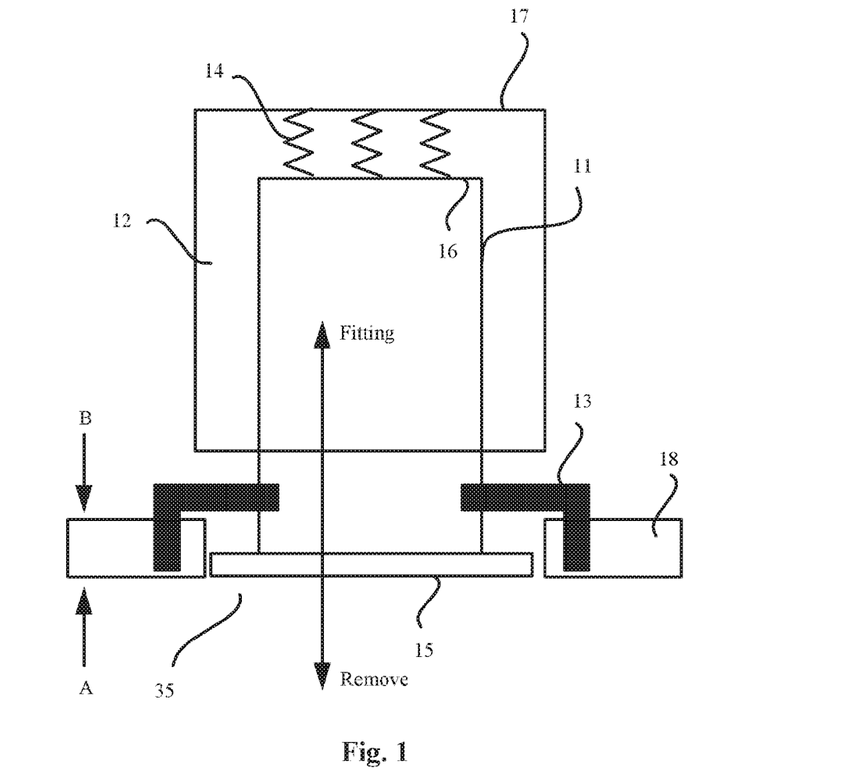
FIG. 1 is a structural schematic diagram showing a device for affixing SIM card according to an exemplary embodiment.

The embodiments of the present disclosure provide a device for affixing SIM card which enables a user to conveniently assembly and disassembly of a SIM card without using an eject pin. Referring to FIG. 1, which is a structural schematic diagram of a device for affixing SIM card according to an exemplary embodiment. The device includes: a card tray 11, a card holder 12, and a locking mechanism 13. The device may be disposed on an outside surface of a mobile phone so that the user may insert the SIM card into the mobile phone without any additional tool. The outside surface may include the side surface of the mobile phone or the bottom surface of the mobile phone.

Figure 2:
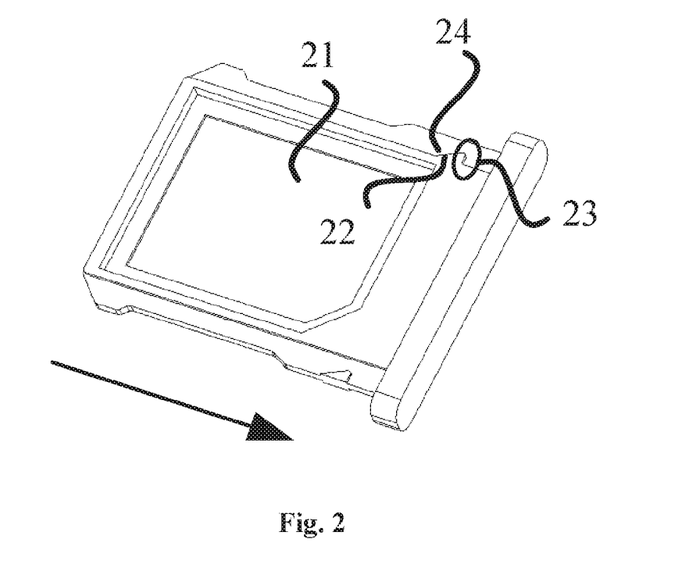
FIG. 2 is a structural schematic diagram showing a card tray of a device for affixing SIM card according to an exemplary embodiment.

Here, a structure of the card tray 11 is shown in FIG. 2. The card tray 11 is configured to bear a SIM card. For example, in order to fit a SIM card into a mobile phone, the SIM card is placed on the card tray 11 firstly and then the card tray 11 is inserted into the mobile phone. Specifically, as shown in FIG. 2, the SIM card is placed on a card slot 21 of the card tray; and it can be seen from FIG. 2 that the card slot 21 includes a cutting angle, which is similar to a SIM card in shape and used for indicating the correct position for placing a SIM card. A coincidence between a SIM card and the card slot in shape is required to place the SIM card properly.

The card holder 12 is configured to bear the card tray when the card tray 11 is fitted into the terminal. For example, the card tray may be actually placed on the card holder 12 when the card tray with the SIM card placed thereon is fitted into a mobile phone. In the embodiments, the card holder 12 includes a first elastic component 14 which may be a spring (for example). The spring is configured to apply a force to the card tray 11 toward outside of the terminal when the SIM card is removed. The force may include a thrust from the spring. As to the device for affixing SIM card provided in the embodiments, the card tray is pushed out of the terminal by the thrust from the spring when the SIM card is being removed, so as to unlock the card tray of the SIM card.

A position for arranging the spring is illustrated in FIG. 1. The card tray 11 includes two side surfaces. One of the side surfaces is an exposed side surface 15 when the card tray is fitted into a terminal. The other one is a rear side surface 16 opposite to the exposed side surface 15 along the direction (as indicated by the arrow in FIG. 1) of assembly or removal of the card tray. The spring may be arranged on a rear wall 17 opposite to the rear side surface 16 of the card tray. It may be seen from FIG. 1 that when the card tray 11 is being removed along the direction as indicated by the arrow, the first elastic component 14 (i.e., the spring) may apply a thrust to the card tray so as to push the card tray outward. In actual implementation, the present embodiment does not limit the quantity or position of the spring as long as it can apply a thrust.

In the embodiments, the locking mechanism 13 is illustrated in FIG. 1. The locking mechanism 13 is configured to affix the card tray 11. For example, when the card tray bearing a SIM card is fitted into the mobile phone, the locking mechanism 13 affixes the card tray so that the card tray 11 does not pop out of the mobile phone. When the locking mechanism 13 quits applying a locking force to the card tray 11, the card tray 11 is popped out of the mobile phone by force of the first elastic component 14 arranged on the card holder 12, thus the SIM card may be removed.

Figure 3:
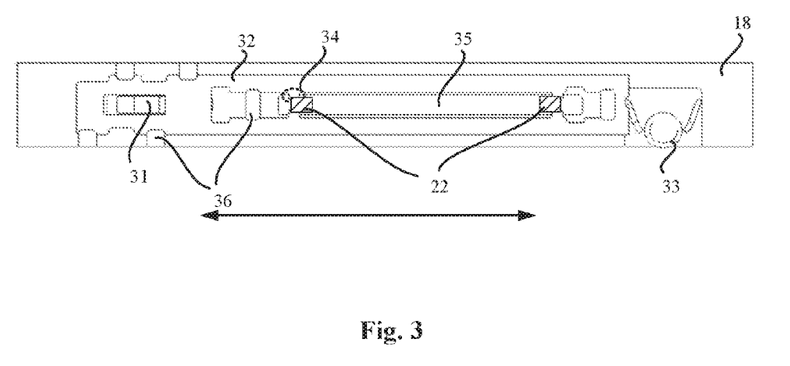
FIG. 3 is a structural schematic diagram showing a locking mechanism of a device for affixing SIM card according to an exemplary embodiment.

A structure of the locking mechanism 13 may be seen in FIG. 3. The structure includes: a press component 31, a lock rod 32, and a second elastic component 33. Here, the lock rod 32 includes a lock catch 34, and FIG. 3 illustrates four lock catches; referring to FIG. 2, the card tray includes a lock piece 22; when the card tray bearing a SIM card is fitted into the terminal, the lock catch 34 and the lock piece 22 on the card tray may form a matching resistance to prevent the card tray from being removed. The matching resistance means that the lock catch 34 is in a position (as shown in the ellipse in FIG. 2) corresponding to the card slot 23 on the card tray. In this way, the lock piece 22 on the card tray may be blocked by the lock catch 34 positioned in the card slot 23 if the card tray is to be removed along the direction as indicated by the arrow in FIG. 2, thus realizing card locking. The card-locking status may be seen with reference to FIG. 4, which shows a card-locking status of the lock catch 34 and the lock piece 22 resisting against each other.

Figure 4:
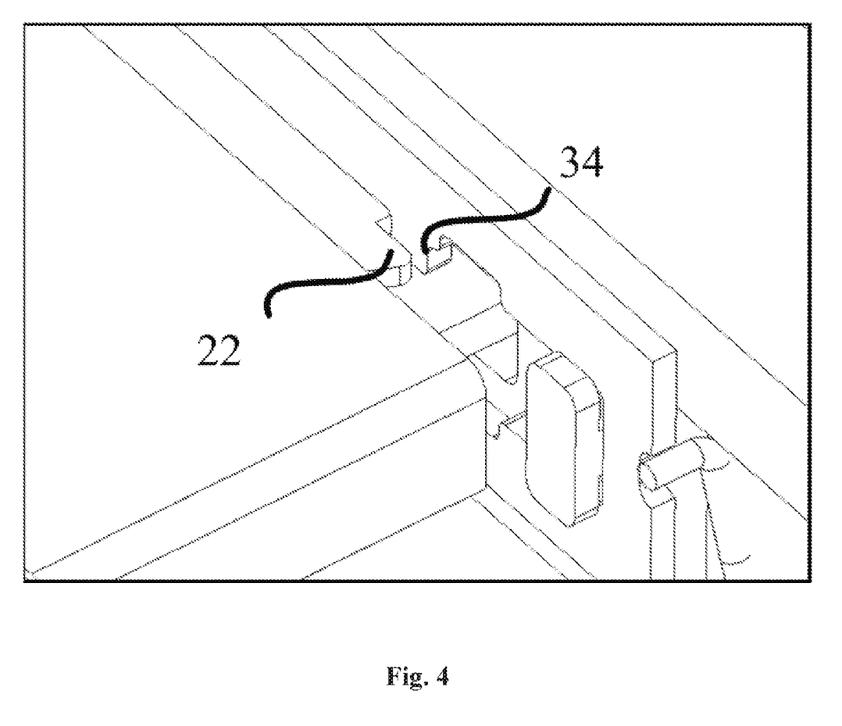
FIG. 4 is a schematic diagram showing a card-locking status of a device for affixing SIM card according to an exemplary embodiment.

In addition, it may be seen from FIG. 2 that the lock piece 22 on the card tray includes an inclined plane 24. When the card tray is fitted into the terminal, the card tray may be gradually pushed into the terminal under the guidance of the inclined plane 24. Also, the inclined plane may apply a thrust to the lock catch 34 on the lock rod 32, so as to shove the lock catch 34, so that the lock piece 22 may break through the obstruction of the lock catch 34 and finally enter into the terminal, while the lock catch 34 enters into the position of the card slot of the card tray, thus reaching the card-locking status as shown in FIG. 4.

It should be explained that in the structure of the embodiments of the present disclosure as illustrated in FIG. 3, the lock rod 32 includes four lock catches 34, and correspondingly, the card tray includes two lock pieces 22. Here, two lock catches 34 are configured to resist against one lock piece, while the other two lock catches 34 are configured to resist against the other lock piece. Referring to FIG. 3, in a card-locking status, two lock catches 34 on the left jointly block one lock piece 22, while the other two lock catches 34 on the right jointly block the other lock piece 22. However, actual implementation does not limit the shape, quantity and position of the lock catch as shown in FIG. 3. For example, two lock catches may be provided, lock catches may be arranged in other positions, and lock catches may be provided in other shapes, as long as card-locking may be realized by matching between lock catches and the lock pieces on the card tray.

In the locking mechanism 13, the press component 31 may include a button. For example, the press component 31 may be a button disposed on the same outside surface as the card holder 12. Alternatively, the press component 31 may be a button disposed on a different outside surface as the card holder 12. The press component 31 may include a button configured to push the lock rod 32 to move when the button is pressed, and further drive the lock catch 34 on the lock rod 32 to move so as to eliminate the matching resistance between the lock catch 34 and the lock piece 22, thus removing the card tray. In other words, when the button is pressed, the lock rod is pushed to move, and further the lock catch 34 may break away from the card slot on the card tray and quit blocking the lock piece 22 on the card tray, then the card tray may be removed, thus removing the SIM card. The reason why the press component 31 can apply such a thrust mentioned above is that the press component includes a driving surface in contact with the lock rod 32. When the press component 31 is pressed, the thrust is applied from the driving surface to the lock rod 32 so as to move the lock catch. The contact action between the driving surface and the lock rod will be illustrated subsequently.

The locking mechanism 13 further includes a second elastic component 33 which may be (for example) a coil spring connected to the lock rod 32, configured to reset the lock rod 32 after the card tray is removed. As shown in FIG. 3, the lock rod 32 further includes a card tray slot 35 which is used for assembly and removal of the card tray. In other words, the assembly and removal of the card tray are achieved through the card tray slot. The card tray slot on the lock rod 32 is corresponding to the card tray slot on the housing 18 as shown in FIG. 1. Therefore, after the foregoing press component 31 is pressed thus driving the lock rod to move, the lock rod needs to be reset so as to ensure that the card tray slot on the lock rod is corresponding to the card tray slot on the housing for successful fitting of the card tray. For example, the lock rod is pushed to the initial position by the elastic force of the coil spring as thrust.

As shown in FIG. 3, the device for affixing SIM card may further include a plurality of locating pieces 36 for applying locating force to the lock rod 32. Specifically, it can be seen with reference to FIG. 3 that the locking mechanism may be arranged on the housing 18, i.e., the locking mechanism may be disposed at least partially on the housing 18. For example, the locking mechanism may be disposed in the border of a mobile phone. Both the first elastic component and the second elastic component in the locking mechanism may be arranged inside the housing. The locating pieces 36 may be arranged on the housing (for example, constituting a one-piece structure together with the housing 18), while the lock rod 32 is movable and can move along the direction as indicated by the arrow in FIG. 3; the lock pieces 22 on the card tray may be blocked or unblocked by the lock catches 34 on the lock rod by means of movement of the lock rod, and the second elastic component 33 may drive the lock rod to move to the initial position so as to guarantee that the card tray slot 35 on the lock rod is at a correct position for successful fitting of the card tray. As the lock rod is movable, like a piece of movable metal sheet, a plurality of locating pieces 36 may be required to guarantee locating of the lock rod during its movement so that the lock rod can move smoothly and steadily.

Figure 5:
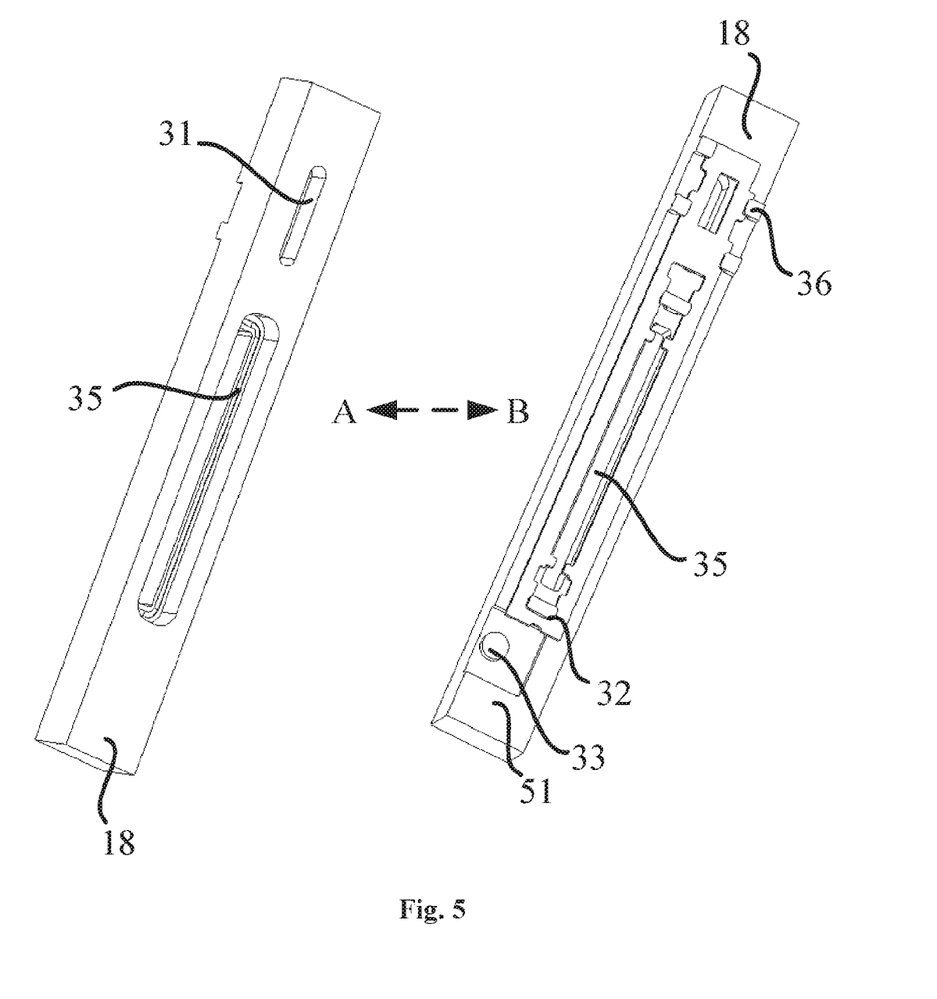
FIG. 5 is a schematic diagram showing two side surfaces of a device for affixing SIM card according to an exemplary embodiment.

FIG. 5 shows two side surfaces of the locking mechanism when it is arranged on the housing 18: a side surface seen from the direction indicated by Arrow A in FIG. 1, and a side surface seen from the direction indicated by Arrow B. Here, the exposed side surface of the mobile phone shell is seen along the direction as indicated by Arrow A, showing the card tray slot 35 and the press component 31 on the housing 18, and the press component 31 may be (for example) a button. The card tray bearing a SIM card may be fitted into a mobile phone through the card tray slot 35. To remove the SIM card from the mobile phone, the foregoing button may be pressed and then the card tray may be popped out by force from the first elastic component on the card holder. The inner side surface instead of the exposed side surface of the mobile phone shell is seen along the direction as indicated by Arrow B. The housing 18 includes the second elastic component 33 and the locating piece 36, etc. The second elastic component 33 may be arranged inside the housing, and the locating piece 36 may be integrated with the housing into a whole. The lock rod 32 may cling to the inner side surface 51 of the housing and move along the inner side surface 51 with steady support from the locating piece 36 during movement of the lock rod.

Figure 6:
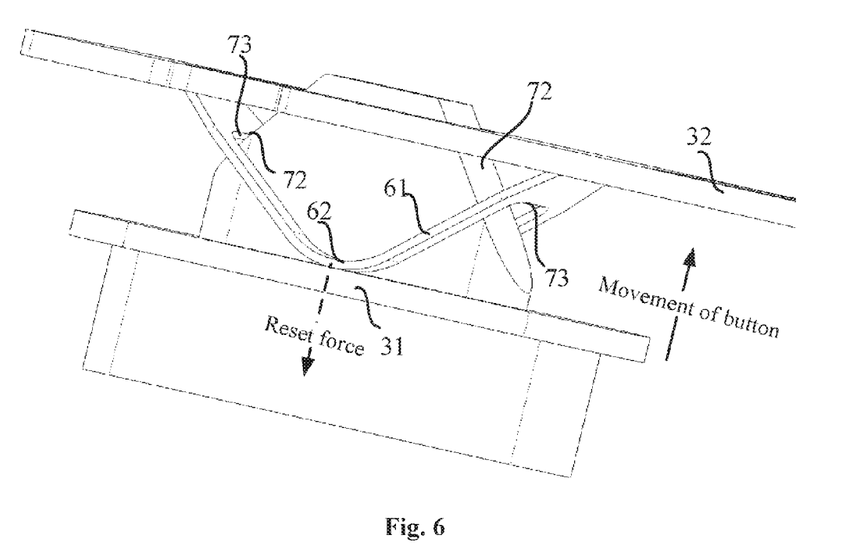
FIG. 6 is a schematic diagram showing provision of a third elastic component of a device for affixing SIM card according to an exemplary embodiment.

In another embodiment, the locking mechanism further includes a third elastic component matched with the press component 31. The third elastic component is configured to reset, under the action of elastic force of the third elastic component, the press component being pressed. Referring to FIG. 6, for example, the third elastic component 61 includes a pressure spring affixed to the lock rod 32, and a driving end 62 of the pressure spring is in contact with the press component 31 so that a reset force may be applied to the press component from the driving end.

Figure 7:
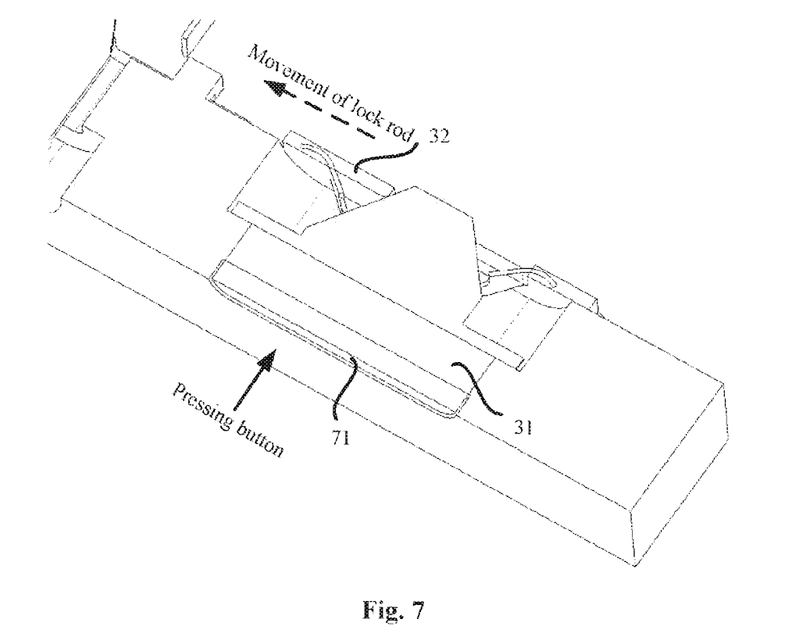
FIG. 7 is a schematic diagram showing principle of a press component of a device for affixing SIM card according to an exemplary embodiment.

For example, referring to FIG. 7, after a button end 71 of the press component 31 is pressed by a user along the direction as indicated by the arrow, the press component may move along the direction as indicated by the arrow in FIG. 6. The press component has a driving surface 72 in contact with the lock rod. There are two driving surfaces 72, respectively in contact with a driven surface 73 of the pressure spring. A thrust is applied to the driven surface from the driving surface, that is, the press component applies a thrust to the pressure spring. Then, the pressure spring, which is affixed to the lock rod, drives the lock rod to move. Referring to FIG. 7, the lock rod 32 may move along the direction as indicated by the dotted arrow until the lock catch on the lock rod moves and quits blocking the lock piece of the card tray, thus removing the card tray. When the user releases the button, the pressure spring may be in contact with the press component 31 at the driving end 62, so as to apply a reset force along the direction as indicated by the dotted arrow in FIG. 6 to the press component 31 from the driving end 62, thus pushing to reset the button.

The foregoing mode for resetting the press component by means of the pressure spring is optional in an exemplary structure. In actual implementation, it is feasible without providing the pressure spring. For example, the press component may be in direct contact with the lock rod at the driving surface, while the other end of the lock rod is connected with the second elastic component (for example, the coil spring). Thus, the coil spring will apply a reset force to the lock rod after the card tray is removed. Meanwhile, the movement of the lock rod will apply a reset force to the press component via the foregoing driving surface so as to reset the press component. In addition, the foregoing pressure spring may be arranged on the housing (for example) rather than on the lock rod.

Figure 8:
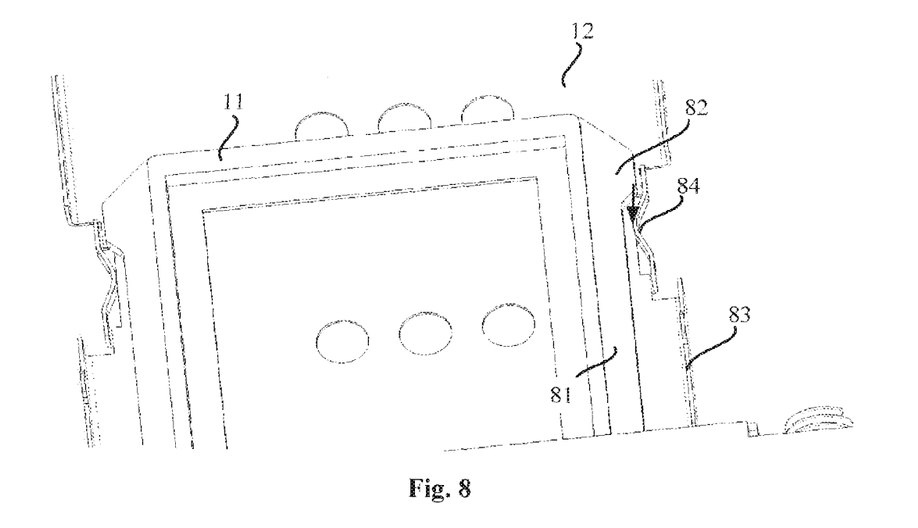
FIG. 8 is a schematic diagram showing a blocking mechanism of a device for affixing SIM card according to an exemplary embodiment.

In a further embodiment, in order to prevent the card tray from popping out under the action of elastic force of the first elastic component when the card tray is being removed, a blocking mechanism may be arranged to hold the card tray. As shown in FIG. 8, the blocking mechanism includes: a first blocking unit 82 arranged at a lateral surface 81 of the card tray 11, and a second blocking unit 84 arranged at a lateral edge 83 of the card holder 12 in the same direction as the lateral surface 81 of the card tray; and the second blocking unit 84 is configured to apply resistance to the first blocking unit 82 when the card tray 11 is being removed, as indicated by the arrow in FIG. 8. When the card tray is being removed, the first blocking unit 82 may be blocked by the second blocking unit 84, thus applying certain resistance to the card tray and preventing the card tray from propping out. The card tray will be not completely removed from the terminal unless being drawn by the user.

On the basis of above description of the structure of the device for affixing SIM card, description of assembly and disassembly of a SIM card will be made respectively with reference to a plurality of drawings.

Card-locking is a process of fitting the card tray bearing a SIM card into a terminal and may be as follows.

Figure 9:
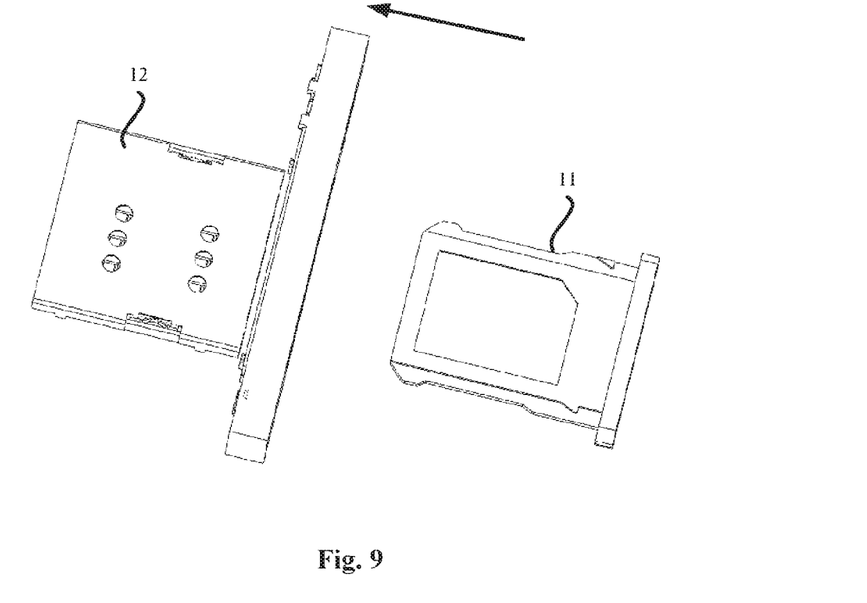
FIG. 9 is a schematic diagram I showing a card-locking status according to an exemplary embodiment.
Figure 10:
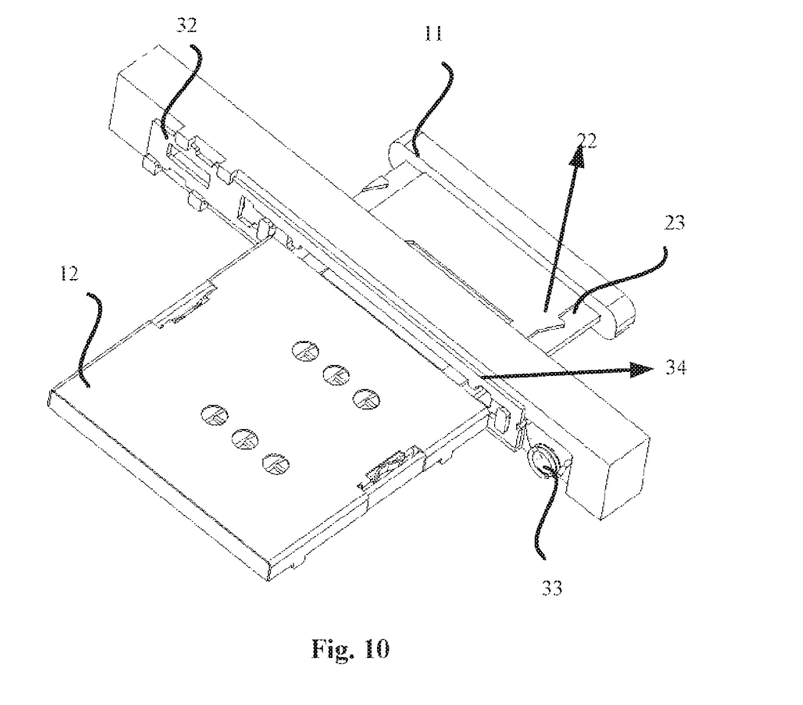
FIG. 10 is a schematic diagram II showing a card-locking status according to an exemplary embodiment.
Figure 11:
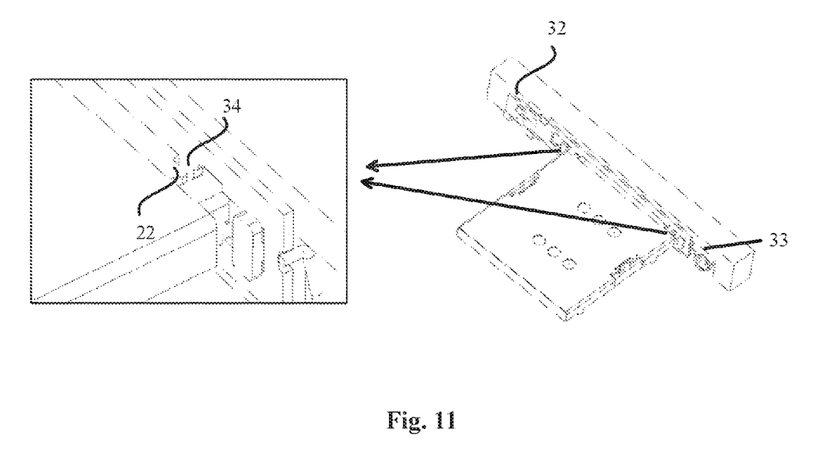
FIG. 11 is a schematic diagram III showing a card-locking status according to an exemplary embodiment.

As shown in FIGS. 9, 10 and 11, the card tray 11 bearing the SIM card is inserted, along the direction as indicated by the arrow, into the slot position of the card tray slot in the housing so as to place the card tray onto the card holder 12. In the process of insertion of the card tray 11, the lock piece 22 on the card tray 11 applies a thrust to the lock catch 34 in the locking mechanism by feat of its inclined plane, driving the lock rod 32 to move and break away from the lock catch 34 until the card tray is placed in the terminal Afterwards, the lock rod 32 is reset by a thrust from the second elastic component 33 (for example, a coil spring), meanwhile the lock catch 34 enters into the card slot 23 of the card tray 11, thus reaching the card-locking status as shown in FIG. 11.

Card-removing is a process of removing the card tray bearing a SIM card out of a terminal and may be as follows.

Figure 12:
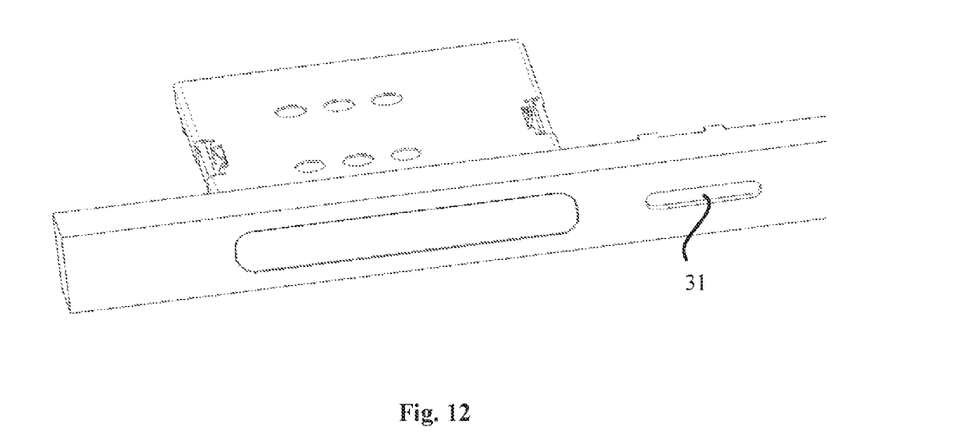
FIG. 12 is a schematic diagram I showing a card-removing status according to an exemplary embodiment.
Figure 13:
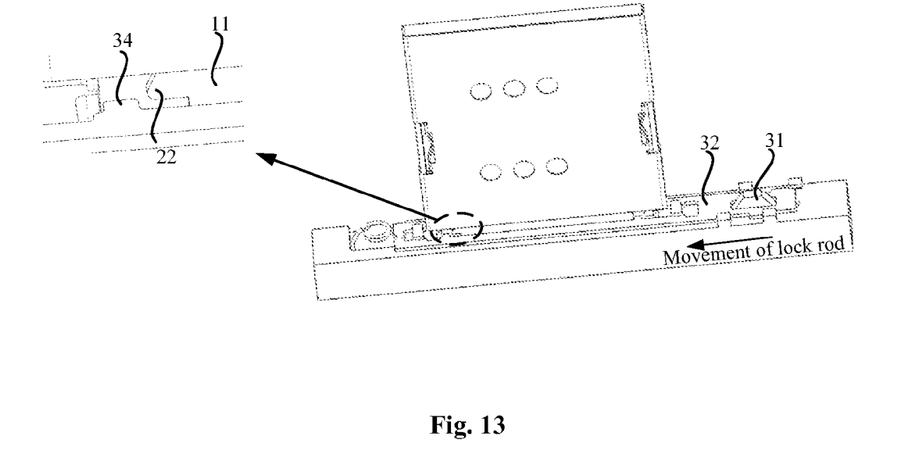
FIG. 13 is a schematic diagram II showing a card-removing status according to an exemplary embodiment.
Figure 14:
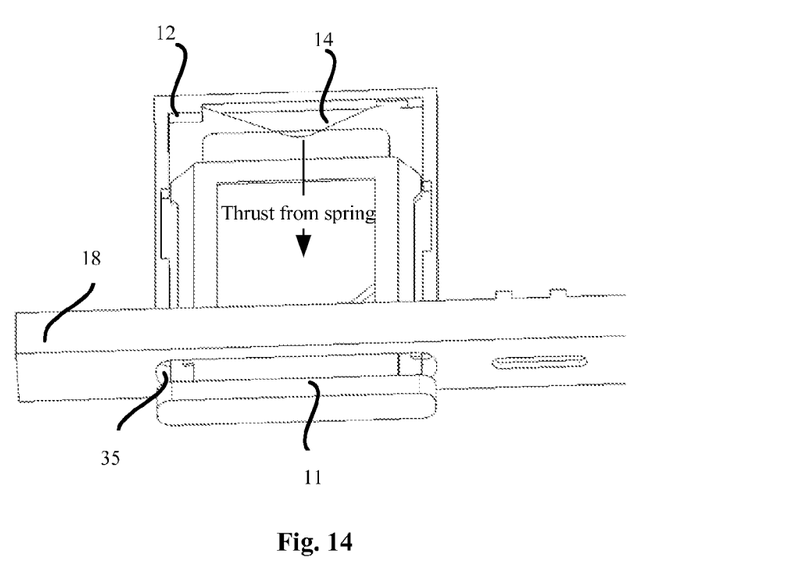
FIG. 14 is a schematic diagram III showing a card-removing status according to an exemplary embodiment.
Figure 15:
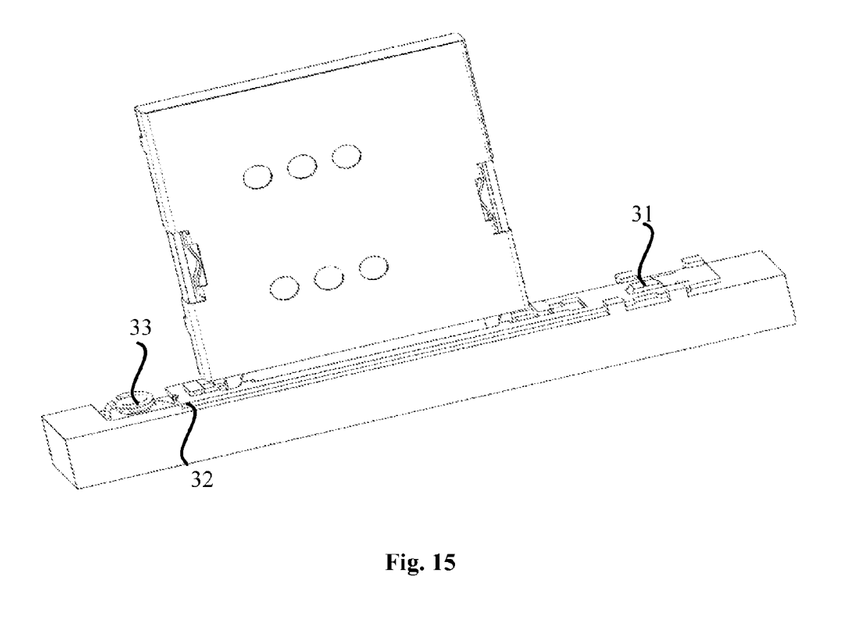
FIG. 15 is a schematic diagram IV showing a card-removing status according to an exemplary embodiment.

As shown in FIGS. 12, 13, 14 and 15, when the press component 31 on the housing as shown in FIG. 12 is pressed, the press component 31 may drive the lock rod 32 to move towards the left as shown in FIG. 13 so that the lock catch 34 on the lock rod 32 also moves towards the left and quits blocking the lock piece 22 on the card tray 11, which may be referred to as an unblocking status of the lock catch. Referring to FIG. 14, under the action of a thrust from the first elastic component 14 (a spring) on the card holder 12, the card tray 11 is removed from the card tray slot 35 of the housing 18. After the card tray is removed, the press component 31 is reset under the action of the pressure spring, and the lock rod 32 is also reset under the action of the second elastic component 33 (a coil spring). Afterwards, the card tray slot on the lock rod is corresponding to the card tray slot on the housing, ready for a next fitting of the card tray.

A user need not take an eject pin along with the device for affixing a SIM card in a mobile terminal according to the present disclosure. The mobile phone includes a start button, which can enable removal or fitting of the SIM card without an eject pin, thus improving the convenience in operation of the mobile phone.

Figure 16:
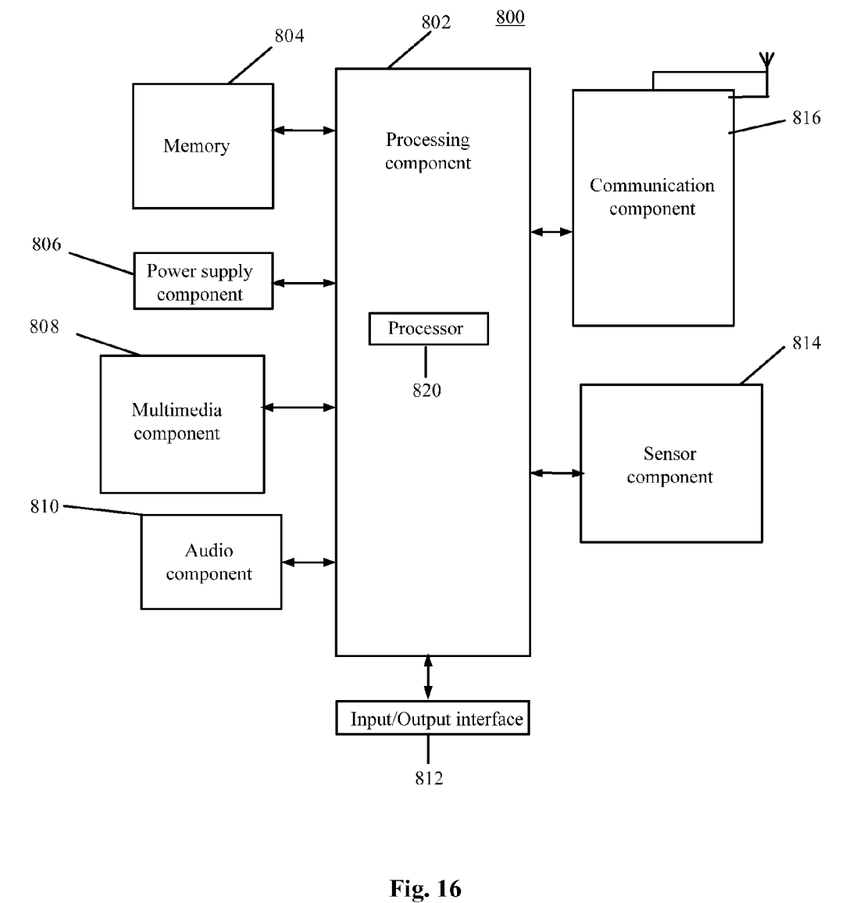
FIG. 16 is a block diagram of a mobile terminal according to an exemplary embodiment.

FIG. 16 is a block diagram of a mobile terminal 800 according to an exemplary embodiment. For example, the mobile terminal 800 may be a mobile telephone. The mobile terminal includes: a housing and the device for affixing SIM card according to the embodiments of the present disclosure; the housing includes a slot for insertion of the card tray, the slot is the foregoing card tray slot on the housing, the device for affixing SIM card is arranged on the housing, and the lock rod of the device for affixing SIM card includes a slot position (i.e., the card tray slot on the lock rod) corresponding to the slot and for insertion of the card tray. Wherein, the pressure spring in the device for affixing SIM card may be affixed to the lock rod or the housing.

Referring to FIG. 16, the mobile terminal 800 may include one or more components as below: a processor component 802, a memory 804, a power supply component 806, a multimedia component 808, an audio component 810, an input/output (I/O) interface 812, a sensor component 814 and a communication component 816.

The processor component 802 generally controls the overall operation of the device 800, for example, display, telephone call, data communication, and operation associated with camera operation and record operation. The processor component 802 may include one or more processors 820 for executing instructions so as to complete steps of the above method in part or in whole. In addition, the processor component 802 may include one or more modules for the convenience of interaction between the processor component 802 and other components. For example, the processor component 802 may include a multimedia module for the convenience of interaction between the multimedia component 808 and the processor component 802.

The memory 804 is configured to store data of different types so as to support the operation of the device 800. Examples of the data include instructions of any application program or method, contact data, phonebook data, message, picture and video, etc, which are operated on the device 800. The memory 804 may be realized by volatile or non-volatile memory device of any type or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 806 provides power for components of the device 800. The power supply component 806 may include a power management system, one or more power supplies, and other components associated with generation, management and power distribution of the device 800.

The multimedia component 808 includes a screen between the device 800 and a user for providing an output interface. In some embodiments, the screen may include an LCD (Liquid Crystal Display) and a touch panel (TP). If the screen includes a touch panel, the screen may be realized as a touch screen for receiving input signal from users. The touch panel includes one or more touch sensors for sensing gestures on the touch panel, for example, touching and sliding, etc. The touch sensor not only can sensor trip boundary of touching or sliding, but also can detect the duration and pressure related to the touching or sliding operation. In some embodiments, the multimedia component 808 includes a front-facing camera and/or a rear-facing camera. When the device 800 is under an operation mode, for example, capture mode or video mode, the front-facing camera and/or the rear-facing camera may receive external multimedia data. Each of front-facing camera and rear-facing camera may be a affixed optical lens system or may have focal length and optical zoom capacity.

The audio component 810 is configured to output and/or input audio signal. For example, the audio component 810 includes a microphone (MIC); when the device 800 is under an operation mode such as call mode, record mode and speech recognition mode, the microphone is configured to receive external audio signal. The audio signal received may be further stored in the memory 804 or sent out by the communication component 816. In some embodiments, the audio component 810 also includes a loudspeaker for outputting audio signal.

The I/O interface 812 provides interface between the processor component 802 and peripheral interface modules, the peripheral interface modules may be a keyboard, a click wheel and buttons, etc. These buttons may include but not limited to: home button, volume button, start button and locking button.

The sensor component 814 includes one or more sensors for providing the device 800 with state evaluation from all aspects. For example, the sensor component 814 may detect the on/off state of the device 800, relative positioning of components, for example, the components are the display and keypads of the device 800; the sensor component 814 also may detect the position change of the device 800 or a component thereof, the presence or absence of users' touch on the device 800, the direction or acceleration/deceleration of the device 800, and temperature variation of the device 800. The sensor component 814 may also include a proximity detector, which is configured to detect the presence of nearby objects without physical touch. The sensor component 814 may also include an optical sensor, for example, CMOS or CCD image sensor for imaging. In some embodiments, the sensor component 814 may also include an acceleration sensor, a gyro sensor, a magnetic sensor, a pressure sensor, or a temperature sensor.

The communication component 816 is configured to facilitate wired communication or wireless communication between the device 800 and other equipment. The device 800 is available for access to wireless network based on communication standards, for example, WiFi, 2G or 3G, or combination thereof. In an exemplary embodiment, the communication component 816 receives by means of a broadcast channel the broadcast signal or broadcast-related information from external broadcast management systems. In an exemplary embodiment, the communication component 816 also includes a near field communication (NFC) module for promoting short-range communication. For example, the NFC module may be realized on the basis of Radio Frequency Identification (RFID) Technology, Infrared Data Association (IrDA) Technology, Ultra-wide Bandwidth (UWB) Technology, Bluetooth (BT) Technology and other technologies.

In exemplary embodiments, the device 800 may be realized by one or more application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, configured to execute the above method.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A device for affixing a SIM card in a terminal, comprising:
 a card tray configured to bear the SIM card;
 a card holder configured to bear the card tray when the card tray is fitted into the terminal, the card holder comprising a first elastic component that comprises a spring configured to apply a force, directed toward the outside of the terminal, to the card tray when the SIM card is being removed; and
 a locking mechanism configured to affix the card tray, the locking mechanism comprising: a press button disposed on an outer side surface of the device, a lock rod, and a second elastic component,
 wherein the lock rod comprises a lock catch, while the card tray comprises a lock piece, and when the card tray bearing the SIM card is fitted into the terminal, the lock catch and the lock piece provide a matching resistance that prevents the card tray from being removed when the locking mechanism is in a locked state;
 wherein the spring is configured to force the card tray out of the terminal when the locking mechanism is in an unlocked state;
 wherein the press button comprises a driving surface in contact with the lock rod, the driving surface is configured to push the lock rod to move along an inner side surface opposite to the outer side surface when the press button is pressed;
 wherein the second elastic component is connected to the lock rod, and configured to reset the lock rod after the card tray is removed;
 wherein the locking mechanism further comprises a third elastic component matched with the press button, the third elastic component being configured to, under action of an elastic force of the third elastic component, reset the press button after being pressed; and
 wherein the housing comprises a slot for insertion of the card tray, the device for affixing SIM card is arranged on the housing, and the lock rod comprises a corresponding slot for insertion of the card tray, the slot is arranged for the card tray to be inserted into the mobile terminal through the slot.

2. The device of claim 1, wherein the first elastic component is arranged on a rear wall of the card holder, opposite to a rear side of the card tray, the rear side being opposite to an exposed side of the card tray when the card tray is fitted into the terminal.

3. The device of claim 1, wherein the card tray comprises two lock pieces, and there are a plurality of lock catches arranged on the lock rod, at least one of the lock catches being configured to resist against one of the two lock pieces, and at least one of the lock catches being configured to resist against the other of the two lock pieces.

4. The device of claim 1, wherein the second elastic component comprises a coil spring.

5. The device of claim 1, wherein the locking mechanism further comprises a third elastic component matched with the press button, the third elastic component being configured to, under action of an elastic force of the third elastic component, reset the press button after being pressed.

6. The device of claim 5, wherein the third elastic component comprises a pressure spring affixed to the lock rod, and a driving end of the pressure spring is in contact with the press button; and
wherein the driving surface is configured to push the lock rod to move and drive the lock catch on the lock rod to move, so as to remove the card tray by eliminating the matching resistance between the lock piece and the lock catch.

7. The device of claim 1, wherein a first blocking unit is disposed on a lateral surface of the card tray, while a second blocking unit is disposed on a lateral edge of the card holder in a same direction as the lateral surface of the card tray, and the second blocking unit is configured to apply resistance to the first blocking unit when the card tray is being removed.

8. The device of claim 1, wherein the locking mechanism further comprises a locating piece, configured to apply a locating force to the lock rod.

9. A mobile terminal, comprising:
a housing, and a device for affixing a SIM in the mobile terminal;
wherein the housing comprises an outer side surface in an opposite side to an inner side surface; and
wherein the device comprises:
a card tray configured to bear the SIM card;
a card holder configured to bear the card tray when the card tray is fitted into the terminal, the card holder comprising a first elastic component that comprises a spring configured to apply a force, directed toward the outside of the terminal, to the card tray when the SIM card is being removed; and
a locking mechanism configured to affix the card tray, the locking mechanism comprising: a press button disposed on the outer side surface of the housing, a lock rod disposed on the inner sider surface of the housing, and a second elastic component,
wherein the lock rod comprises a lock catch, while the card tray comprises a lock piece, and when the card tray bearing the SIM card is fitted into the terminal, the lock catch and the lock piece provide a matching resistance that prevents the card tray from being removed when the locking mechanism is in a locked state;
wherein the press button comprises a driving surface in contact with the lock rod, the driving surface is configured to push the lock rod to move when the press button is pressed;
wherein the spring forces the card tray out of the terminal when the locking mechanism is in an unlocked state;
wherein the second elastic component is connected to the lock rod, and configured to reset the lock rod after the card tray is removed;
wherein the locking mechanism further comprises a third elastic component matched with the press button, the third elastic component being configured to, under action of an elastic force of the third elastic component, reset the press button after being pressed; and
wherein the housing comprises a slot for insertion of the card tray, the device for affixing SIM card is arranged on the housing, and the lock rod comprises a corresponding slot for insertion of the card tray, the slot is arranged for the card tray to be inserted into the mobile terminal through the slot.

10. The mobile terminal of claim 9, wherein the device comprises a pressure spring for affixing SIM card is affixed to the lock rod or the housing; and
wherein the driving surface is configured to push the lock rod to move and drive the lock catch on the lock rod to move, so as to remove the card tray by eliminating the matching resistance between the lock piece and the lock catch.

11. The mobile terminal of claim 9, wherein the first elastic component is arranged on a rear wall of the card holder, opposite to a rear side of the card tray, the rear side being opposite to an exposed side of the card tray when the card tray is fitted into the terminal.

12. The mobile terminal of claim 9, wherein the card tray comprises two lock pieces, and there are a plurality of lock catches arranged on the lock rod, at least one of the lock catches being configured to resist against one of the two lock pieces, and at least one of the lock catches being configured to resist against the other of the two lock pieces.

13. The mobile terminal of claim 9, wherein the second elastic component comprises a coil spring.

14. The mobile terminal of claim 9, wherein the locking mechanism further comprises a third elastic component matched with the press button, the third elastic component being configured to, under action of an elastic force of the third elastic component, reset the press button after being pressed.

15. The mobile terminal of claim 14, wherein the third elastic component comprises a pressure spring affixed to the lock rod, and a driving end of the pressure spring is in contact with the press button.

16. The mobile terminal of claim 9, wherein a first blocking unit is disposed on a lateral surface of the card tray, while a second blocking unit is disposed on a lateral edge of the card holder in a same direction as the lateral surface of the card tray, and the second blocking unit is configured to apply resistance to the first blocking unit when the card tray is being removed.

17. The mobile terminal of claim 9, wherein the locking mechanism further comprises a locating piece, configured to apply a locating force to the lock rod.

18. A mobile terminal, comprising: a housing and a device for affixing SIM card in the mobile terminal, wherein the device comprises:
a card tray configured to bear the SIM card;
a card holder configured to bear the card tray when the card tray is fitted into the terminal, the card holder comprising a first elastic component configured to apply a force, directed toward the outside of the terminal, to the card tray when the SIM card is being removed; and
a locking mechanism configured to affix the card tray, the locking mechanism comprising: a press button, a lock rod, and a second elastic component,
wherein the lock rod comprises a lock catch, while the card tray comprises a lock piece, and when the card tray bearing the SIM card is fitted into the terminal, the lock catch and the lock piece provide a matching resistance that prevents the card tray from being removed;

wherein the press button comprises a driving surface in contact with the lock rod, the driving surface is configured to push the lock rod to move when the press button is pressed;

wherein the second elastic component is connected to the lock rod, and configured to reset the lock rod after the card tray is removed;

wherein the locking mechanism further comprises a third elastic component matched with the press button, the third elastic component being configured to, under action of an elastic force of the third elastic component, reset the press button after being pressed; and wherein the housing comprises a slot for insertion of the card tray, the device for affixing SIM card is arranged on the housing, and the lock rod comprises a corresponding slot for insertion of the card tray, the slot is arranged for the card tray to be inserted into the mobile terminal through the slot.

19. The mobile terminal of claim 18, further comprising a pressure spring in the device for affixing SIM card is affixed to the lock rod or the housing.

20. The mobile terminal of claim 18, wherein when the press button is pressed, the driving surface is configured to push the lock rod to move and drive the lock catch on the lock rod to move, so as to remove the card tray by eliminating the matching resistance between the lock piece and the lock catch.

* * * * *